US009148508B2

(12) United States Patent (10) Patent No.: US 9,148,508 B2
Bucko et al. (45) Date of Patent: Sep. 29, 2015

(54) SYSTEMS AND METHODS OF INTERCEPTING TELEPHONY COMMUNICATIONS TO PROVIDE INFORMATION TO COMMUNICANTS

(71) Applicant: VONAGE NETWORK, LLC, Holmdel, NJ (US)

(72) Inventors: Andrew Bucko, Old Bridge, NJ (US); Stephan Van Saders, Manalapan, NJ (US); Jason Farkas, Belle Meade, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/721,532

(22) Filed: Dec. 20, 2012

(65) Prior Publication Data

US 2014/0177478 A1 Jun. 26, 2014

(51) Int. Cl.
*H04M 15/00* (2006.01)
*H04M 3/42* (2006.01)
*H04M 3/487* (2006.01)
*H04M 3/22* (2006.01)

(52) U.S. Cl.
CPC ...... *H04M 3/42051* (2013.01); *H04M 3/42093* (2013.01); *H04M 3/4874* (2013.01); *H04M 3/2281* (2013.01); *H04M 2201/18* (2013.01)

(58) Field of Classification Search
USPC .................................... 379/114.13, 252, 257
See application file for complete search history.

(56) References Cited

U.S. PATENT DOCUMENTS

| | | | |
|---|---|---|---|
| 6,510,417 B1* | 1/2003 | Woods et al. ................ | 704/275 |
| 6,836,537 B1 | 12/2004 | Zirngibl et al. | |
| 6,907,116 B2* | 6/2005 | Ung et al. ................ | 379/114.16 |
| 7,548,614 B2* | 6/2009 | Sharma .................... | 379/114.01 |
| 7,548,932 B2 | 6/2009 | Horvitz et al. | |
| 8,000,751 B2 | 8/2011 | Saranu et al. | |
| 8,204,492 B2 | 6/2012 | Diroo et al. | |
| 2003/0039339 A1 | 2/2003 | Luehrig et al. | |
| 2008/0049912 A1* | 2/2008 | Carter et al. .............. | 379/88.22 |
| 2009/0003580 A1 | 1/2009 | Sharpe et al. | |
| 2010/0087182 A1 | 4/2010 | Stewart et al. | |
| 2010/0115034 A1 | 5/2010 | Sheth et al. | |
| 2010/0274672 A1* | 10/2010 | Patel ......................... | 705/14.66 |

(Continued)

FOREIGN PATENT DOCUMENTS

EP 1 696 645 8/2006
WO WO 2007/109342 9/2007

OTHER PUBLICATIONS

Non-final Office Action in U.S. Appl. No. 13/324,505 dated Aug. 1, 2013.
International Search Report issued in PCT/US2012/068689 on Jun. 6, 2013.
Written Opinion issued in PCT/US2012/068689 on Jun. 6, 2013.
Final Office Action in U.S. Appl. No. 13/324,505 dated Jun. 12, 2014.

*Primary Examiner* — Quoc D Tran
(74) *Attorney, Agent, or Firm* — Nixon & Vanderhye P.C.; Joseph Pagnotta

(57) ABSTRACT

During setup of a telephony communication between a calling and a called party, a check is made to determine is a special message or information should be played to the calling or called party before the telephony communication is established between the calling and called parties. If so, the message or information is delivered to the party as early media. Systems and methods embodying the invention may track which messages and information have been played to individual parties to thereby avoid delivering the same message or information more than once.

32 Claims, 5 Drawing Sheets

(56) References Cited

U.S. PATENT DOCUMENTS

| | | |
|---|---|---|
| 2010/0306061 A1* | 12/2010 | Wagner .................. 705/14.66 |
| 2011/0124352 A1 | 5/2011 | Reinhold et al. |
| 2012/0140914 A1* | 6/2012 | Ho et al. ................. 379/215.01 |
| 2012/0177033 A1* | 7/2012 | Sterman ...................... 370/352 |
| 2013/0003952 A1* | 1/2013 | Whitten et al. ............ 379/93.17 |
| 2013/0101100 A1* | 4/2013 | Pradeep ..................... 379/114.1 |
| 2013/0148646 A1 | 6/2013 | Efrati et al. |
| 2013/0223436 A1 | 8/2013 | Efrati |
| 2013/0294593 A1* | 11/2013 | Xing et al. ............... 379/114.13 |

* cited by examiner

SYSTEMS AND METHODS OF INTERCEPTING TELEPHONY COMMUNICATIONS TO PROVIDE INFORMATION TO COMMUNICANTS

BACKGROUND OF THE INVENTION

The invention is related to Internet Protocol (IP) telephony systems. More specifically, the invention is related to systems and methods for determining when it would be proper or desirable to provide information to communicants of a telephony communication.

Presently, when a telephony communication is being setup between a calling party and a called party, it is possible to play audio to either the calling or called party before the telephony communication is actually established between the calling and called parties. Such audio is generally referred to as "early media." The ring tone played to the calling party during call setup is an example of early media in its simplest form.

It would be desirable to use information about the calling or called party to deliver advanced or more tailored messages or information to calling and called parties, in the form of early media, before the telephony communication is established between the calling and called parties.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
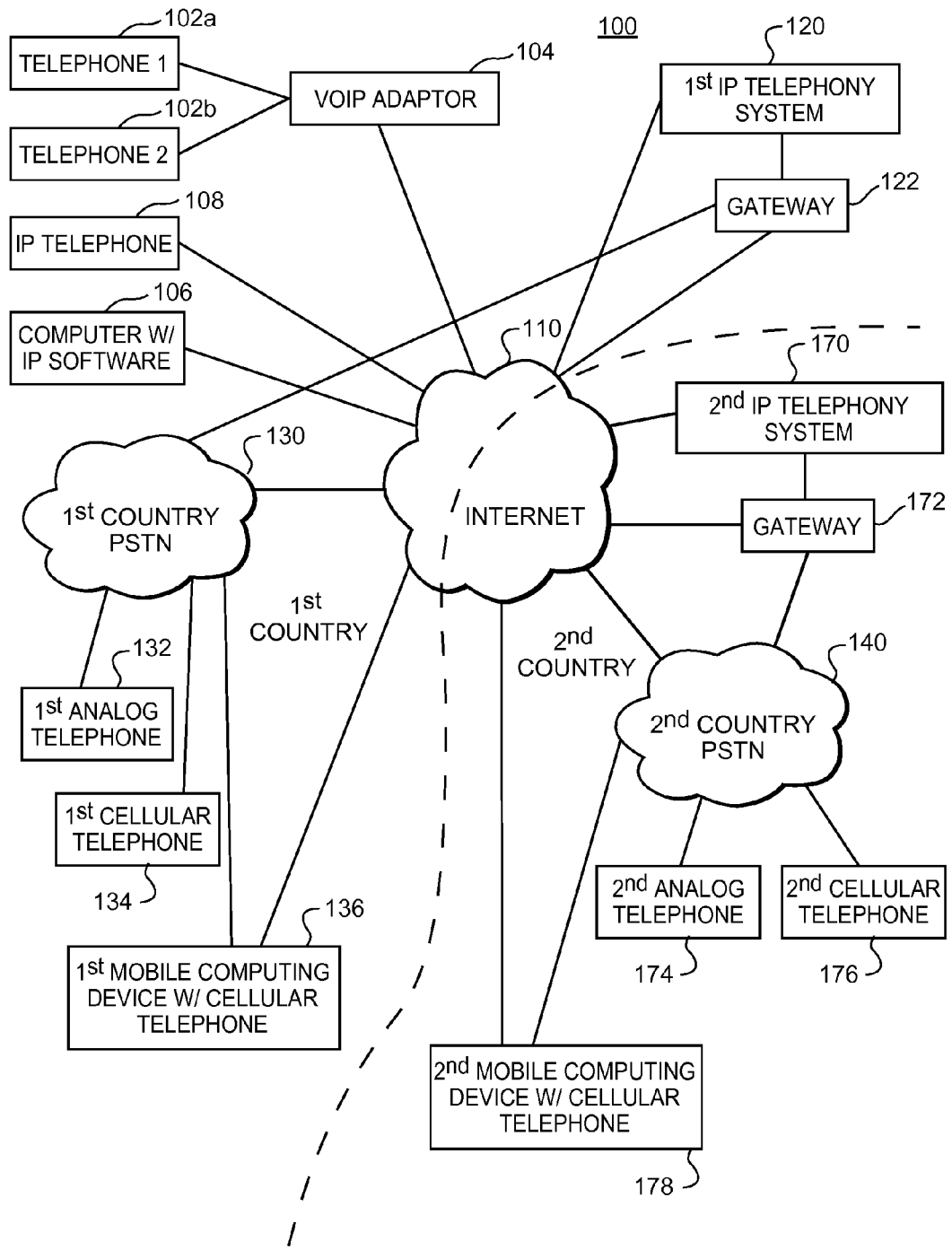
FIG. 1 is a diagram of a communications environment including various elements which are associated with an Internet protocol (IP) telephony system operating in accordance with the invention.

As illustrated in FIG. 1, a communications environment 100 is provided to facilitate IP based communications. A first IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a first publicly switched telephone network (PSTN) 130 and a second PSTN 140 via one or more gateways 122.

The gateway 122 allows users and devices that are connected to the first and second PSTNs 130, 140 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephone devices 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using the first analog telephone 132 which is connected to the first PSTN 130 may call a customer of the IP telephony system 120. In this instance, the call is initially connected from the first analog telephone 132 to the first PSTN 130, and then from the first PSTN 130, through the gateway 122 to the first IP telephony system 120. The first IP telephony system 120 then routes the call to the customer's IP telephony device. A third party using the first cellular telephone 134 could also place a call to an IP telephony system customer, and the connection would be established in a similar manner, although the first link would involve communications between the first cellular telephone 134 and a cellular telephone network. For purposes of this explanation, the cellular telephone network is considered part of the first PSTN 130.

In addition, mobile computing devices which include cellular telephone capabilities could also be used to place telephone calls to customers of the IP telephony system. The first mobile computing device 136, as illustrated in FIG. 1, might connect to the first PSTN 130 using its cellular telephone capabilities. However, such devices might also have the ability to connect wirelessly via some other means. For example, the mobile computing device 136 might communicate with a wireless data router to connect the first mobile computing device 136 directly to a data network, such as the Internet 110. In this instance, communications between the first mobile computing device 136 and other parties could be entirely carried by data communications which pass from the first mobile computing device 136 directly to a data network 110.

Of course, alternate embodiments could utilize any other form of wired or wireless communications path to enable communications.

Users of the first IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the first analog telephone 132 or first cellular telephone 134 that is routed through the first PSTN 130 to the first IP telephony system 120 via the gateway 122. This would typically be accomplished by the user calling a local telephone number that is routed to the first IP telephony system 120 via the gateway 122. Once connected to the first IP telephony system 120, the user may then place an outgoing long distance call to anywhere in the world using the first IP telephony system's network. Thus, the user is able place a long distance call using lower cost IP telephony service provided by the first IP telephony system 120, rather than a higher cost service provided by the first PSTN 130.

FIG. 1 also illustrates that a second IP telephony system 170 may interact with the first IP telephony system 120 via the Internet 110. For example, customers of the second IP telephony system 170 may place calls to customers of the first IP telephony system 120. In that instance, assets of the second IP telephony system 170 interact with assets of the first IP telephony system 120 to setup and carry the telephone call. Conversely, customers of the first IP telephony system 120 can place calls to customers of the second IP telephony system 170.

The second IP telephony system could also interact with customers of a second PSTN 140 via a gateway 172. The second PSTN 140 may be connected to a second analog telephone 174, a second cellular telephone 176 and a second mobile computing device 178.

In the following description, we will assume that the first IP telephony system 120, the first PSTN 130, the IP telephone 108, the VOIP adaptor 104, the first analog telephone 132, the first cellular telephone 134 and the first mobile computing device 136 are all located in a first country. Also, the second IP telephony system 170, the second PSTN 140, the second analog telephone 174, the second cellular telephone 176 and the second mobile computing device 178 are all located in a second country.

Figure 2:
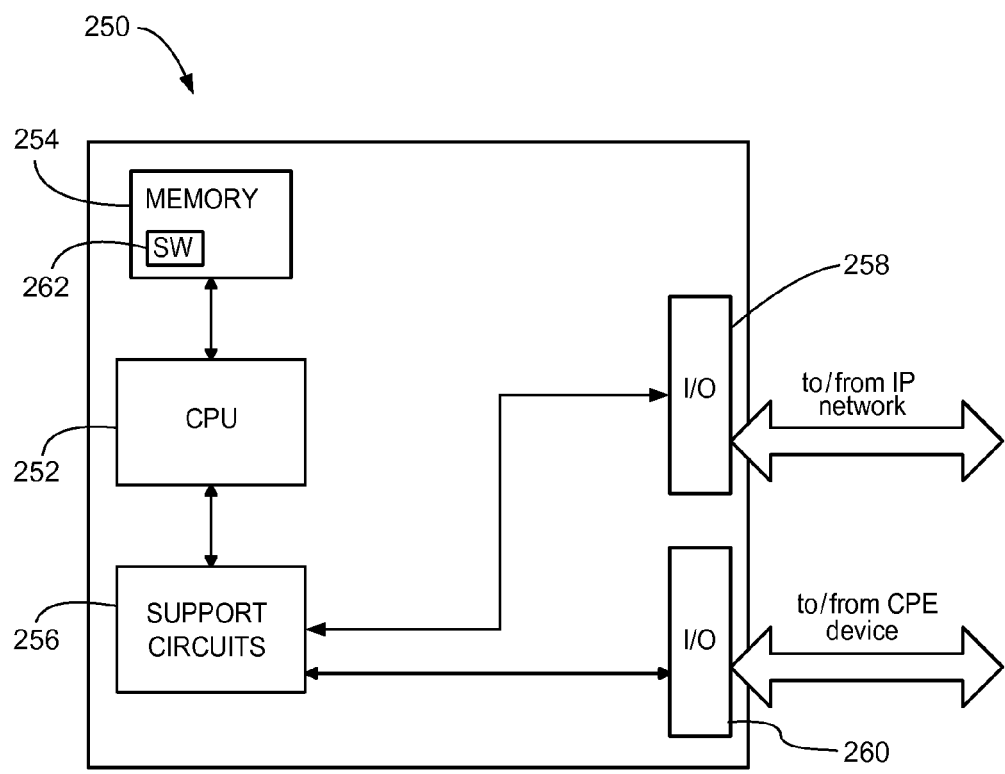
FIG. 2 is a diagram of various elements of a processor that forms part of an IP telephony system.

FIG. 2 illustrates elements of a computer processor 250 that can be used as part of the first or second IP telephony systems 120, 170 to accomplish various functions. Each of the IP telephony systems 120, 170 could include multiple processors 250 located at various locations in the system, along with their operating components and programming, each carrying out a specific or dedicated portion of the functions performed by the IP telephony systems 120, 170.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto.

The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephone communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
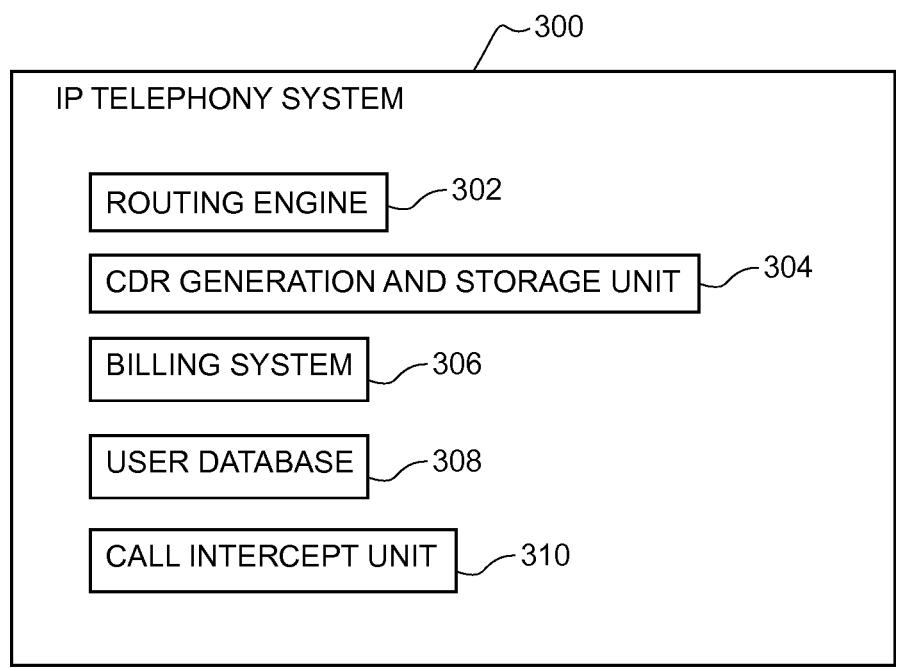
FIG. 3 is a block diagram illustrating some elements of an Internet Protocol system embodying the invention.

FIG. 3 illustrates elements of an IP telephony system 300 embodying the invention. The IP telephony system includes a routing engine 302 that provides information to help route IP telephony communications to the appropriate party. When a call setup request is received from a calling party's telephony device, the routing engine 302 may, among other functions, provide the IP addresses of gateways that are capable of terminating a telephony communication to the telephony device of the called party identified in the call setup request.

The IP telephony system 300 also includes a call detail record (CDR) generation and storage unit 304 and a billing system 306. The CDR generation and storage unit 304 obtains information about telephony communications that have been handled by the IP telephony system from various sources and creates at least one final CDR for each telephony communication. The billing system 306 uses the information in the CDRs to bill for the telephony communications.

The IP telephony system 300 also includes a user database 308. The user database 308 can include various items of information about the users/clients of the IP telephony system 300. In addition to biographical information, the user database 308 could include information about a user's calling habits and usage patterns, as well as a variety of other information. In some instances, the user database 308 could include information about individuals who are not users or clients of the IP telephony system 300. For example, the user database 308 could include information about individuals with whom the users/clients of the IP telephony system 300 communicate.

The IP telephony system 300 also includes a call intercept unit 310. When a call setup request is received from a calling party's telephony device, the call intercept unit 310 checks to determine if a message or information should be played to the calling or called party, before the telephony communication is established between the calling and called party. Details of the call intercept unit 310 and how it operates are provided below.

When a calling party requests that a telephony communication be established with a called party, there are many situations where it would be desirable to provide information or a message to the calling party before the telephony communication is actually established. For example, if the charges for conducting a telephony communication between the calling and called parties have recently increased, the calling party may not be aware of the new, higher rates. It would be desirable to inform the calling party of the new, higher rates before the calling party conducts the communication. Once the calling party learns of the new, higher rates, the calling party may decide not to proceed with the telephony communication, or to at least keep the telephony communication brief.

Figure 4:
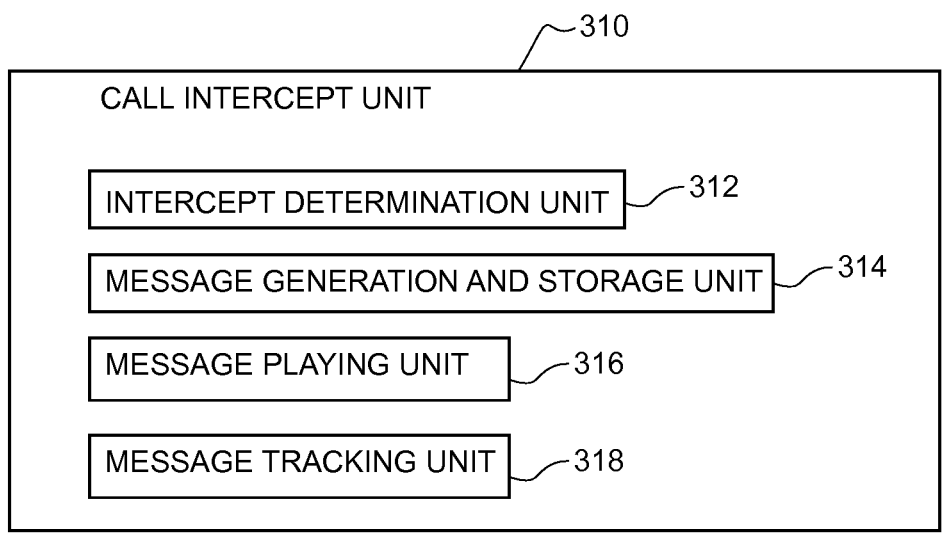
FIG. 4 is a diagram illustrating selected elements of a call intercept unit embodying the invention.

FIG. 4 illustrates some elements of a call intercept unit 310 embodying the invention. The call intercept unit 310 includes an intercept determination unit 312 that determines when to provide a calling or called party with a message or information before a telephony communication is established between the calling and called parties.

The call intercept unit 310 also includes a message generation and storage unit 314. The message generation and storage unit 314 can be utilized by system operators to create special messages that are to be played to parties. Those messages are also stored by the message generation and storage unit 314. The messages may be cross-referenced to situations, characteristics and other data that indicates when it would be desirable to play the message to the calling or called parties. Thus, the information stored in the message generation and storage unit 314 can include information about when it is desirable to play the messages.

The call intercept unit 310 further includes a message playing unit 316 that plays messages to calling or called parties under the direction of the intercept determination unit 312. As explained above, such a message can be delivered to a calling or called party as early media. However, other methods of delivering the message are also within the scope of the invention.

For example, when a caller places his telephony device off-hook, and before the caller dials a telephone number, the message playing unit 316 might deliver a message to the caller. Playing audio/video to the caller before the caller dials a number might not be considered early media, but it still provides an opportunity for the call intercept unit 310 to deliver a message to the caller or to interact with the caller for various purposes.

In other instances, the call intercept unit 310 might play a message to a party or interact with the party after a call has been connected. For example, after a call has been connected, the call intercept unit 310 might play a message to the calling party to inform the calling party that is credit in an account with the telephony service provider is about to expire. Here again, playing a message to the caller in this fashion would not be considered early media. But even after the caller has been connected, it would still be possible for the call intercept unit 310 to deliver a message to the caller or to interact with the caller.

If the call intercept unit 310 does deliver a message to the caller or interact with the caller after the caller has been connected to a called party, the time spent delivering the message or interacting with the caller could be subtracted from the total duration of the call, for which the caller would be charged. This would prevent caller from being forced to pay for time spent hearing the message or interacting with the call intercept unit 310.

The call intercept unit 318 also includes a message tracking unit 318. The message tracking unit 318 tracks when each message stored in the message generation and storage unit 314 is played to an individual. As a result, it is possible for the intercept determination unit 312 to determine whether a message has already been played to a particular individual, and if so, how many times and when.

In some instances, it would be desirable to play a certain message to a party only once, or only a limited number of times. For example, if the rates for conducting a telephony communication to a called party have recently increased, it would be desirable to play a message about the rate increase the first time that a calling party attempts to establish a telephony communication to the called party. Or perhaps the message would be played to the calling party the first three times that the calling party attempts to establish a telephony communication that will incur the new, higher rates. But once the calling party has been fully informed of the rate change, it would only become annoying to hear the same message played many times. For these reasons, the message tracking unit 318 tracks when each message has been played to each party, and that information is used to avoid delivering the same message to the same party more than a specified number of times.

Figure 5:
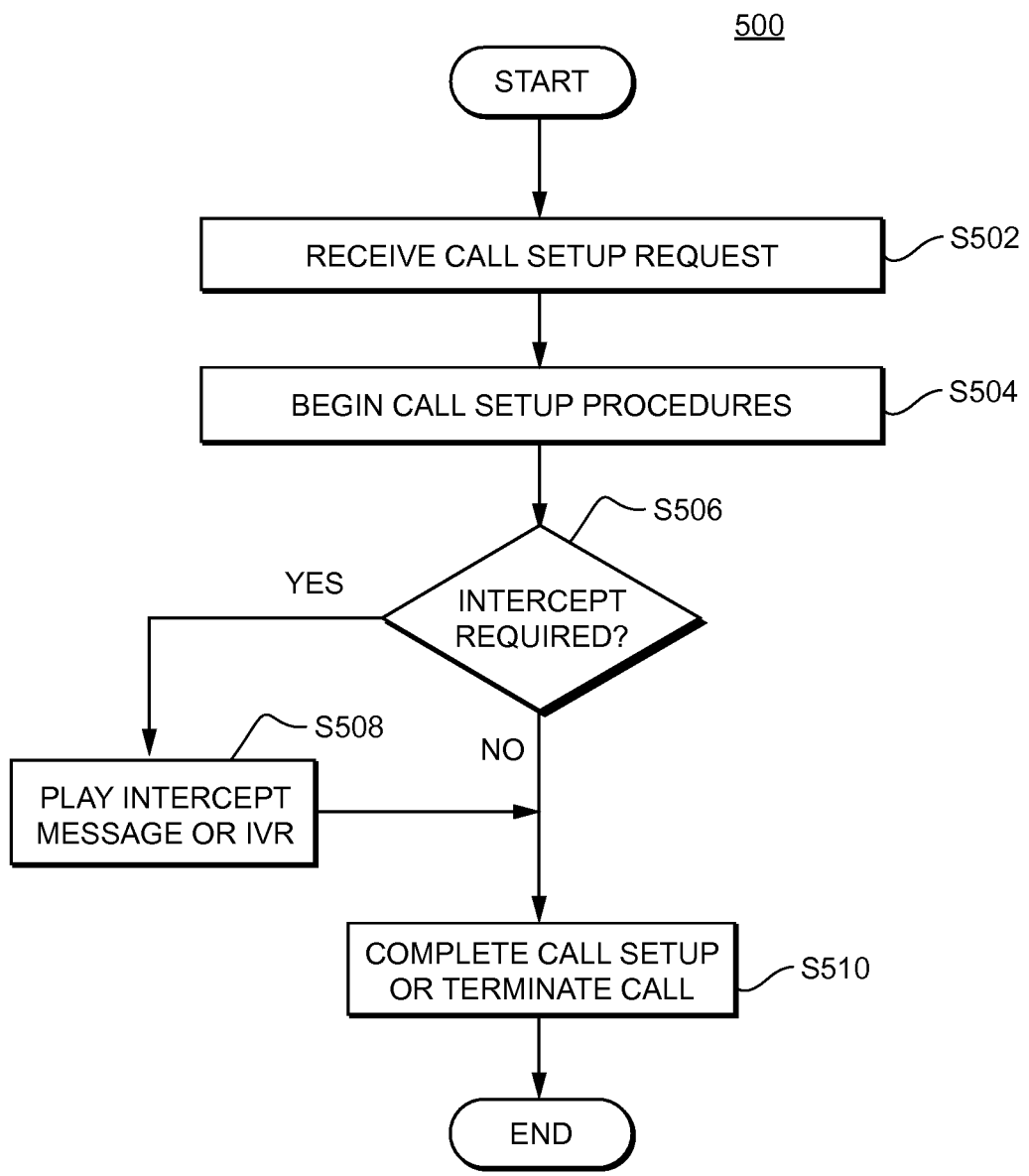
FIG. 5 is a flowchart illustrating steps of a method embodying the invention.

FIG. 5 illustrates steps of a method 500 that would be performed by a telephony system embodying the invention. The method begins and proceeds to step S502 where a call setup request is received from a calling party. The call setup request would likely include an identifier for a called party with whom the calling party would like to establish a telephony communication. In many instances, the identifier would be the telephone number assigned to the telephony device used by the called party. The call setup request would likely also include an identifier for the calling party. In some instances, the identifier would be the telephony number assigned to the telephony device used by the calling party. However, other identifiers associated with the calling party might also be provided. For example, if the calling party is using an IP telephony device, the call setup request could include a unique identifier assigned to the calling party's IP telephony device. The call setup request could include other useful information, such as an IP address used by the calling party's IP telephony device, which could be used to determine where the calling party is presently located.

In step S504, the IP telephony system 300 begins to attempt to setup the telephony communication between the calling and called parties. This could include consulting a routing engine 302 of the IP telephony system 300 to obtain the IP addresses of one or more gateways that are capable of completing the telephony communication to the called party's telephony device. This could also include sending a setup request to the gateway identified by the routing engine 302.

Next, in step S506, the intercept determination unit 312 of a call intercept unit 310 determines whether it would be desirable to provide a message or information to the calling or called parties before the telephony communication is established between the calling and called parties. This determination can be based on multiple different factors.

The intercept determination unit 312 may use an identifier associated with the called party, such as the called party's telephone number, to determine that a message or information should be provided to the called or calling party. For example, if the calling party is attempting to place a call to a called party that is in a location where the rates have recently increased, the telephone number of the called party could be used to determine that the calling party will be charged the new, higher rates. And this information is then used to determine that it is desirable to play a message to the calling party about the new, higher rates.

In other instances, the intercept determination unit 312 could use an identifier associated with the calling party, such as the calling party's telephone number, to determine that it is desirable to play a message to the calling or called party. This information would be included in the call setup request that was received in step S502.

In other instances, the intercept determination unit 312 could use an identity, location or characteristic of the calling party, or an identity, location or characteristic of the called party to determine if it is desirable to play a message to the calling or called party. The identity of the calling or called party could be obtained from the information in the call setup request. Once the identity of the calling and/or called party is known, the intercept determination unit 312 could consult a user database 308 of the IP telephony system 300, or some other source of information, to obtain or determine the location of the calling or called party, or to obtain information about other characteristics of the calling and called parties.

The intercept determination unit 312 may use the information it obtains about the calling and/or called parties to consult with the message generation and storage unit 314 to determine if there is a message or information that should be played to the calling or called parties. As explained above, the messages and information are cross-correlated to various items of information about calling and called parties. If there is a match, then the intercept determination unit 312 determines that a message or information should be played to the calling or called party.

If the determination made in step S506 indicates that a message or information should be played to one or both of the calling and called parties, then the method proceeds to step S508, and the message playing unit 316 of the call intercept unit 310 plays the message or information to the calling or called party. In some instances, this would involve playing an audio or video message to the calling or called party as early media. However, other methods of delivering the message or information could also be performed.

In addition to playing an audio or video message, the message playing unit 316 may cause an interactive voice response IVR system to be performed for the calling and/or called party. In this instance, the calling or called party would have an opportunity to interact with the IVR system to obtain potentially useful information.

At the conclusion of step S508, the message tracking unit 318 is informed of what message or messages were played to what individuals. As explained above, the message tracking unit 318 tracks what messages were played to whom, when, and how often. This information is used by the intercept determination unit during step S506 to determine if it is desirable to play a message or information to a calling or called party. For example, information about the calling or called party may indicate that it is desirable to play a particular message to the calling party. But the intercept determination unit 312 may learn from the message tracking unit 318 that the message has already been played to the calling party three times, which is the set maximum number of repetitions for playing the message to an individual. Under those circumstances, although the characteristics of the parties would indicate that a message should be played to the calling party, the message is not played because the calling party has already heard the message the maximum number of times.

After the message or information is played to either or both of the calling and called parties, the method proceeds to step S510, where the telephony communication is either established between the calling and called parties, or where the call setup attempt is terminated by one or both parties. Of course, if the determination made in step S506 indicates that it is not desirable to play a message or information to the calling or called parties, the method would have proceeded straight from step S506 to step S510.

As mentioned above, a variety of different factors can be used to determine when it is desirable to play a particular message to a calling or called party. The information used to make the determination could all relate to the calling party, could all relate to the called party, or could be a combination of items regarding the calling party and items regarding the called party. Also, in some circumstances, the factors that are used to determine that it is desirable to play a particular message could have nothing to do with either party.

In the foregoing embodiments and examples, multiple references were made to receiving a call setup request, and to establishing a call between a calling and called party.

Although audio and video calls are examples of telephony communications that can be established between a calling and called party, the invention is equally applicable to other forms of telephony communications. Indeed, the terms "calling party" and "called party" suggest that the parties are conducting an audio or video call. However, the parties could also be engaging in other forms of telephony communications. For these reasons, the terms "call," "calling party" and "called party" are in no way to be considered limiting. The invention also applies to delivering messages and information to parties that are attempting to establish other forms of telephony communications beyond audio and video calls.

Systems and methods embodying the invention are applicable to instances where a first IP telephony device is seeking to setup a telephony communication with a second IP telephony device. However, the systems and methods described above are equally applicable to situations where a first IP telephony device is attempting to setup a telephony communication with an analog or cellular telephone, or where an analog or cellular telephony is attempting to setup a telephony communication with an IP telephone. The systems and methods are also applicable to instances where an analog or cellular telephone is attempting to setup a telephony communication with another analog or cellular telephone.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing information to at least one of a calling party and a called party while a telephony communication is being setup between the calling party and the called party, comprising:
    receiving a call setup request for the purpose of connecting the calling party to the called party;
    initiating call setup procedures to connect the calling party to the called party;
    determining whether to provide information relevant to the telephony communication being setup to at least one of the calling party and the called party while the call setup procedures are ongoing and before the telephony communication is established between the calling party and the called party, wherein the determination is based on at least one characteristic associated with at least one of the calling party and the called party;
    tracking a number of times the information relevant to the telephony communication being setup has been provided to at least one of the calling party and the called party;
    providing information relevant to the telephony communication being setup to at least one of the calling party and the called party before the telephony communication is established between the calling party and the called party based on the result of the determining step and when the number of times is below a specified value; and
    preventing the information relevant to the telephony communication being setup from being provided to at least one of the calling party and the called party when the number of times exceeds the specified value.

2. The method of claim 1, wherein the at least one characteristic comprises at least one of an identifier, an identity, a location or a characteristic of the called party.

3. The method of claim 1, wherein the at least one characteristic comprises at least one of an identifier, an identity, a location or a characteristic of the calling party.

4. The method of claim 1, wherein the receiving step comprises receiving an identifier associated with the called party as part of the setup request, and wherein the determining step is based on the received identifier associated with the called party.

5. The method of claim 4, wherein the received identifier is a telephone number associated with the called party.

6. The method of claim 1, wherein the determining step comprises:
    obtaining information about the calling party based on information contained in the received call setup request; and
    using the obtained information to determine whether to provide information to at least one of the calling party and the called party.

7. The method of claim 1, wherein the determining step comprises:
    obtaining information about the called party based on information contained in the received call setup request; and
    using the obtained information to determine whether to provide information to at least one of the calling party and the called party.

8. The method of claim 7, wherein the obtained information includes a location of the called party.

9. The method of claim 1, wherein the determining step comprises determining whether the calling party has already been provided with a particular piece of information at least once in the past.

10. The method of claim 1, wherein the determining step comprises:
    determining an identity of the calling party; and
    consulting a message tracking unit to determine whether the calling party has already been provided with a particular piece of information at least once in the past.

11. The method of claim 1, further comprising recording the fact that the calling party has been provided with a particular piece of information after the piece of information has been provided to the calling party.

12. The method of claim 1, wherein the providing step comprises performing an interactive voice response system for at least one of the calling party or the called party.

13. The method of claim 1, wherein the determining step comprises determining whether to provide information to the calling party while the telephony communication is being setup, and wherein the providing step comprises providing information to the calling party before the telephony communication is established between the calling party and the called party based on the result of the determining step.

14. The method of claim 1, wherein the determining step comprises determining whether to provide information to the called party while the telephony communication is being setup, and wherein the providing step comprises providing information to the called party before the telephony communication is established between the calling party and the called party based on the result of the determining step.

15. A system for providing information to at least one of a calling party and a called party while a telephony communication is being setup between the calling party and the called party, comprising:
   means for receiving a call setup request for the purpose of connecting the calling party to the called party;
   means for initiating call setup procedures to connect the calling party to the called party;
   means for determining whether to provide information relevant to the telephony communication being setup to at least one of the calling party and the called party while the call setup procedures are ongoing and before the telephony communication is established between the calling party and the called party, wherein the determination is based on at least one characteristic associated with at least one of the calling party and the called party;
   means for tracking a number of times the information relevant to the telephony communication being setup has been provided to at least one of the calling party and the called party;
   means for providing information relevant to the telephony communication being setup to at least one of the calling party and the called party before the telephony communication is established between the calling party and the called party based on the determination made by the determining means and when the number of times is below a specified value; and
   means for preventing the information relevant to the telebony communication being setup from being provided to at least one of the calling party and the called party when the number of times exceeds the specified value.

16. A system for providing information to at least one of a calling party and a called party while a telephony communication is being setup between the calling party and the called party, comprising:
   an intercept determination unit that receives information about a call setup request that has been received for the purpose of connecting the calling party to the called party, initiates call setup procedures to connect the calling party to the called party, determines whether to provide information relevant to the telephony communication being setup to at least one of the calling party and the called party while the call setup procedures are ongoing and before the telephony communication is established between the calling party and the called party, wherein the determination is based on at least one characteristic associated with at least one of the calling party and the called party, and tracks a number of times the information relevant to the telephony communication being setup has been provided to at least one of the calling party and the called party; and
   a message playing unit that provides information relevant to the telephony communication being setup to at least one of the calling party and the called party before the telephony communication is established between the calling party and the called party based on the determination made by the intercept determination unit and when the number of times is below a specified value, and prevents the information relevant to the telephony communication being setup from being provided to at least one of the calling party and the called party when the number of times exceeds the specified value.

17. The system of claim 16, wherein the at least one characteristic comprises at least one of an identifier, an identity, a location or a characteristic of the called party.

18. The system of claim 16, wherein the at least one characteristic comprises at least one of an identifier, an identity, a location or a characteristic of the calling party.

19. The system of claim 16, wherein the intercept determination unit receives an identifier associated with the called party as part of the setup request, and wherein the determination about whether to provide information to at least one of the calling party and the called party is based on the received identifier associated with the called party.

20. The system of claim 19, wherein the received identifier is a telephone number associated with the called party.

21. The system of claim 16, wherein the intercept determination unit obtains information about the calling party based on information contained in the received call setup request, and wherein the intercept determination unit uses the obtained information to determine whether to provide information to at least one of the calling party and the called party.

22. The system of claim 16, wherein the intercept determination unit obtains information about the called party based on information contained in the received call setup request, and wherein the intercept determination unit uses the obtained information to determine whether to provide information to at least one of the calling party and the called party.

23. The system of claim 22, wherein the obtained information includes a location of the called party.

24. The system of claim 16, wherein the intercept determination unit determines whether the calling party has already been provided with a particular piece of information at least once in the past.

25. The system of claim 16, wherein the intercept determination unit determines an identity of the calling party, and consults a message tracking unit to determine whether the calling party has already been provided with a particular piece of information at least once in the past.

26. The system of claim 16, further comprising a message tracking unit that records the fact that the calling party has been provided with a particular piece of information after the piece of information has been provided to the calling party.

27. The system of claim 16, wherein the message playing unit causes an interactive voice response system to interact with at least one of the calling party or the called party.

28. The system of claim 16, wherein the intercept determination unit determines whether to provide information to the calling party while the telephony communication is being setup, and wherein the message playing unit provides information to the calling party before the telephony communication is established between the calling party and the called party based on the determination made by the intercept determination unit.

29. The system of claim 16, wherein the intercept determination unit determines whether to provide information to the called party while the telephony communication is being setup, and wherein the message playing unit provides information to the called party before the telephony communication is established between the calling party and the called party based on the determination made by the intercept determination unit.

30. The method of claim 1, wherein the information relevant to the telephony communication being setup is information related to a service provider setting up the telephony communication.

31. The method of claim 1, wherein the information relevant to the telephony communication being setup is information related to a cost of the communication that will be incurred if the communication is established between the calling party and the called party.

32. The method of claim 1, wherein the information relevant to the telephony communication being setup is information related to an account maintained by a telephony service provide for at least one of the called party and the calling party.

* * * * *